Oct. 4, 1932. S. L. BOUKARD 1,880,745

SEALING PLUG

Filed May 18, 1931

INVENTOR.
Samuel L. Boukard.
BY
Townsend, Loftus & Abbett.
ATTORNEYS.

Patented Oct. 4, 1932

1,880,745

UNITED STATES PATENT OFFICE

SAMUEL L. BOUKARD, OF SAN FRANCISCO, CALIFORNIA, ASSIGNOR TO ALFRED WHITTELL, OF SAN FRANCISCO, CALIFORNIA

SEALING PLUG

Application filed May 18, 1931. Serial No. 538,372.

This invention relates to a sealing plug particularly intended for use in conjunction with rotary valves such as used in internal combustion engines, air compressors and the like.

The use of a sealing plug in conjunction with a rotary valve is old and well known, see for instance the rotary valves and cooperating plugs used in conjunction with internal combustion engines as illustrated in United States Patents Nos. 1,308,722 and 1,666,513, issued July 1, 1919 and April 17, 1928, respectively. In actual practice considerable trouble has been encountered in maintaining a snug fit between the plug and the valve; in preventing leakage around the plug and in maintaining lubrication sufficient to prevent sticking of the plug.

The object of the present invention is to generally improve and simplify the operation of sealing plugs of the character described, and particularly to provide a sealing diaphragm whereby leakage around the plug is prevented, a snug fit with relation to the valve is maintained, and lubrication troubles entirely eliminated.

The invention is shown by way of illustration in the accompanying drawing, in which—

Figure 1:
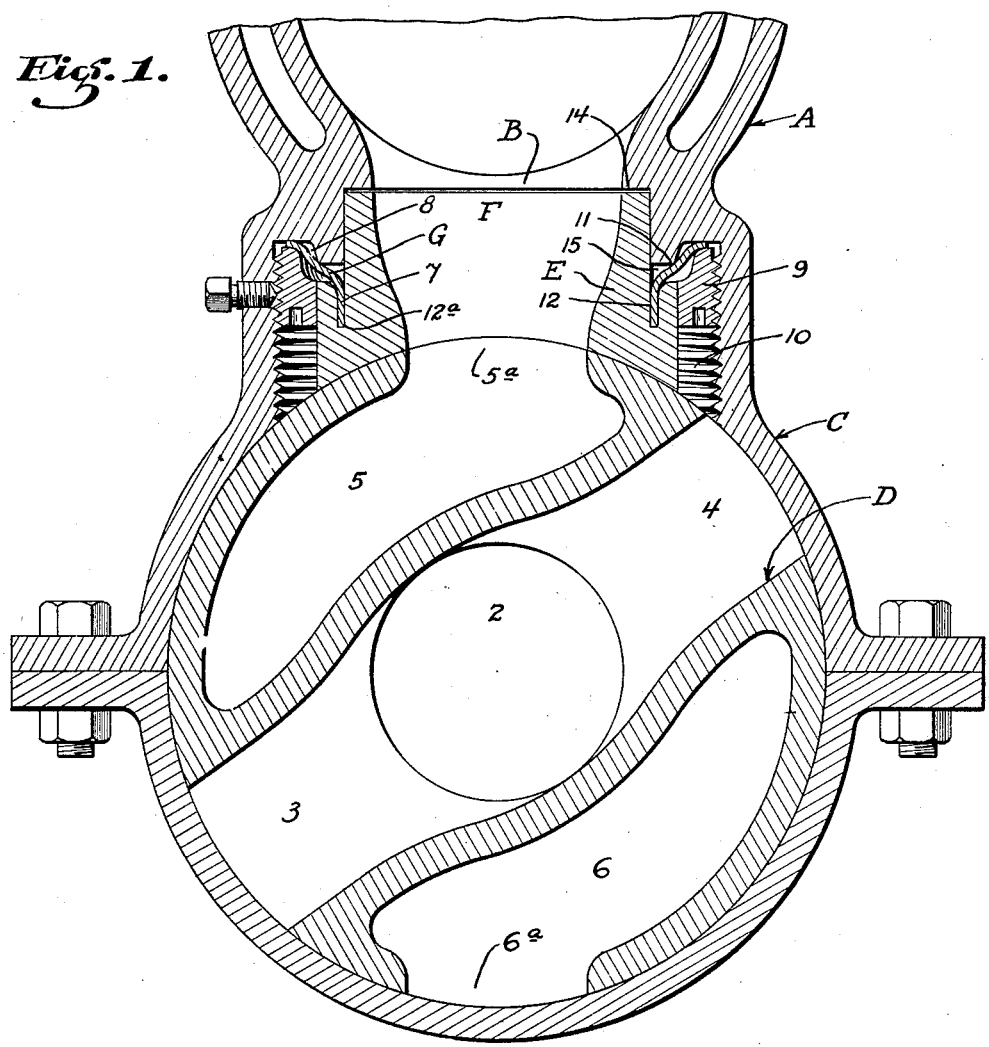
Fig. 1 is a central, longitudinal section showing the sealing plug and its cooperating diaphragm when interposed between a rotary valve and a compression chamber of an internal combustion engine.

Referring to the drawing in detail and particularly Fig. 1, A indicates one end of a cylinder such as used on an internal combustion engine or the like, B the compression chamber formed in the cylinder, and C an extension of the cylinder in which is mounted a rotary valve D. Interposed between the cylinder A and the valve D is a sealing plug E and formed therein is a combination inlet and exhaust passage F. The rotating valve shown in the present instance is provided with a central exhaust passage 2 with ports 3 and 4 at opposite ends and it is provided with passages 5 and 6 which connect with ports 5a and 6a. Two inlet and two exhaust ports are accordingly provided which during rotation of the valve will register with the combination inlet and exhaust passage F, hence causing the ports to register with the passage F and an inlet manifold during the intake cycle and with an exhaust manifold during the exhaust cycle in a manner well known; it being understood that the valve will be rotated at a four to one ratio with relation to the crank shaft of the engine through a suitable reduction gear drive not shown.

Figure 2:
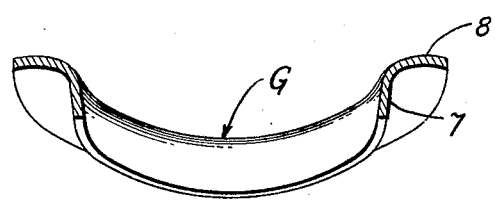
Fig. 2 is a perspective view of the sealing diaphragm.

When sealing plugs such as illustrated are employed the problem of preventing leakage around the plug has proven rather difficult. In the present instance it has been entirely overcome by the use of a sealing diaphragm such as shown at G. The diaphragm is sleeve-like in shape as shown at 7 in Fig. 2 and it is provided at one end with an outwardly flaring flange 8. The housing extension C is recessed to receive the plug E and the diaphragm G and a clamping nut 9, the recess being internally threaded as at 10 to receive the nut. When the diaphragm is inserted as shown in Fig. 1 the inner peripheral edge of the flange 8 will rest on an annular shoulder 11. The sleeve-like portion 7 extends into an annular groove 12 formed in the plug and when the clamping nut is applied it exerts pressure on the flange 8 bending it as shown; the amount of pressure applied being sufficient to form a positive seal between the flange of the diaphragm and the annular shoulder 11. The spacing between the side walls of the groove 12 is substantially the same as the thickness of the metal forming the sleeve portion of the diaphragm, just sufficient clearance being provided to permit a sliding clearance between the sleeve and the plug, as the plug must be free to move endwise as will hereinafter be described; the groove being sufficiently deep to permit such movement.

In actual practice if the valve and plug are applied to an internal combustion engine the plug and diaphragm will be subjected both to pressure and to suction action. For instance, during the intake stroke there is a tendency to pull the plug and the diaphragm away from the valve and as a slight endwise movement, as previously stated, is permitted the plug will move away from the valve, the movement of the plug, however, being limited by an annular shoulder 14. The suction pressure is comparatively slight, seldom in excess of twelve pounds absolute, hence there is only a slight tendency for leakage around the plug during the suction stroke of the engine. During compression of the charge the plug and diaphragm are subjected to pressure and tend to move in the opposite direction, the movement being limited by the plug engaging the face of the valve D. It is during the period of compression and firing that a snug fit and prevention of leakage is of particular importance. During compression and firing a small amount of gas may leak around the shoulder 14 and the exterior of the plug and thus enter the space indicated at 15. The gases cannot leak by the shoulder 11 as the diaphragm is held in tight engagement therewith through means of the clamping nut 9, nor can they leak around the sleeve end of the diaphragm or through the groove 12 as the pressure of the gases against the inner faces of the diaphragm maintain the same in snug engagement with the outer face of the groove 12 and indicated at 12a. Furthermore, it might be said that an elaborate form of packing connection is formed at this point which further retards movement or leakage of gases. The gas admitted during the compression and firing stroke will be removed during the suction stroke and vice versa, hence a lubricant will freely enter and discharge at least once during each complete cycle of operation. The lubricant supplied to the face of the valve D will enter the recess provided for the reception of the plug and the clamping nut 9 and an ample supply of lubricant will thus be maintained to lubricate that face of the plug which engages the face of the valve and as the plug has a slight endwise movement, as previously described, the lubricant is permitted to freely enter during the suction stroke so as to renew the film of oil between the contacting faces. Sticking of the plug is thus prevented; leakage of gases around the same is prevented; and a snug fit between the plug and valve is insured due to the endwise movement provided. It might be said that the wear between the face of the valve and the plug is in that manner automatically taken up.

The importance of the sliding action between the sleeve-like portion of the diaphragm and the plug should be apparent. To avoid any leakage around the diaphragm at the point where the sliding connection is formed a snug fit between the sleeve-like portion and the groove 12 is provided. In addition thereto the pressure of the gases in the space 15 tends to expand the sleeve portion of the valve and thereby maintain it in contact with the inner face 12a of the groove. The pressure of the clamping nut 9 on the flange 8 also tends to maintain the sleeve portion of the diaphragm in contact with the face 12a and any wear that takes place at this point is thus also automatically taken up and leakage prevented.

While certain features of the present invention are more or less specifically described, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is—

1. The combination with a housing having a rotary valve mounted therein and a port in the housing adapted to be opened and closed during rotation of the valve, of a sealing plug interposed between the port and the valve, said plug having a central passage formed therein in communication with the first named passage, a sealing diaphragm surrounding the plug, means securing the outer peripheral edge of the diaphragm and preventing leakage around said edge, and means whereby a sliding engagement is maintained between the inner edge of the diaphragm and the plug to prevent leakage around the inner edge of the diaphragm.

2. The combination with a housing having a rotary valve mounted therein and a port in the housing adapted to be opened and closed during rotation of the valve, said port being enlarged at the end adjacent the valve, a sealing plug mounted in the enlarged end of the port and engaging the valve, said plug having a central passage formed therein in communication with the first named port, a sealing diaphragm surrounding the plug, means securing the outer peripheral edge of the diaphragm and preventing leakage around said edge, and means whereby a sliding fit is maintained between the inner edge of the diaphragm and the plug to prevent leakage around the inner edge of the diaphragm.

3. The combination with a housing having a rotary valve mounted therein and a port in the housing adapted to be opened and closed during rotation of the valve, said port being enlarged at the end adjacent the valve, a sealing plug mounted in the enlarged end of the port and engaging the valve, said plug having a central passage formed therein in communication with the first named port, a diaphragm, sleeve-shaped at one end and surrounding the plug, an annular flange on the opposite end of the diaphragm, and clamping means engaging and securing said flange.

4. The combination with a housing having a rotary valve mounted therein and a port in the housing adapted to be opened and closed during rotation of the valve, said port being enlarged at the end adjacent the valve, a sealing plug mounted in the enlarged end of the port and engaging the valve, said plug having a central passage formed therein in communication with the first named port, a diaphragm, sleeve-shaped at one end and surrounding the plug, an annular groove formed on the exterior surface of the plug into which the sleeve extends there being a snug sliding fit between the walls of the groove and the sleeve, an annular flange on the opposite end of the sleeve, an annular shoulder within the first named port engaging one face of the diaphragm flange, and a clamping member engaging the opposite face of the flange.

5. In combination with a rotary valve housing having a port formed therein, and a hollow sealing plug in said port, sealing means around the plug comprising a diaphragm secured with relation to the walls of the port and frictionally engaging the plug.

6. In combination with a rotary valve housing having a port formed therein, and a hollow sealing plug in said port, sealing means around the plug comprising a diaphragm secured with relation to the walls of the port and frictionally engaging the plug, said sealing means being resilient and normally urging the plug toward the interior of the valve housing.

7. In combination with a rotary valve housing having a port formed therein, a hollow sealing plug in said port, an annular shoulder in the port and surrounding the plug, a diaphragm surrounding the plug and frictionally engaging it, and clamping means securing the diaphragm with relation to the walls of the port and pressing the diaphragm into engagement with said annular shoulder.

8. In combination with a rotary valve housing having a port formed therein, a sealing plug in said port, said sealing plug having an annular groove formed therein, a diaphragm having one edge disposed in said groove, and means securing the other edge of the diaphragm with relation to the walls of said port.

SAMUEL L. BOUKARD.